United States Patent [19]

Pirovano

[11] 4,215,653
[45] Aug. 5, 1980

[54] WATERING-TROUGH FOR CHICKENS AND LIKE FOWL

[76] Inventor: Camillo Pirovano, Via Spluga 52, Cernusco Lombardone (Como), Italy

[21] Appl. No.: 886

[22] Filed: Jan. 4, 1979

[30] Foreign Application Priority Data

Jan. 18, 1978 [IT] Italy ............................... 19400 A/78

[51] Int. Cl.² ............................................. A01K 39/02
[52] U.S. Cl. ..................................................... 119/81
[58] Field of Search ......................................... 119/81

[56] References Cited

U.S. PATENT DOCUMENTS

| 2,724,402 | 11/1955 | Kofford | 119/81 |
| 4,164,201 | 8/1979 | Vanderhye | 119/81 |

Primary Examiner—Jay N. Eskovitz
Attorney, Agent, or Firm—Stevens, Davis, Miller & Mosher

[57] ABSTRACT

A watering trough for chickens and like fowl is disclosed, of the kind comprising a bell member having an annular gutter integral therewith in the bottom portion, a supporting upright loaded by a ballast and water feeding means internally of the bell, the improvement consisting in having the bell member limitedly tiltable about a horizontal axis placed at the bottom of the gutter and a spring at the top of the bell to counteract the tilting motion and to open and close the water feeding nozzle also situated at the top of the bell. The device is self-reloading and can be used both resting on the ground directly and hung by means of a suspension tab.

7 Claims, 1 Drawing Figure

U.S. Patent  Aug. 5, 1980  4,215,653
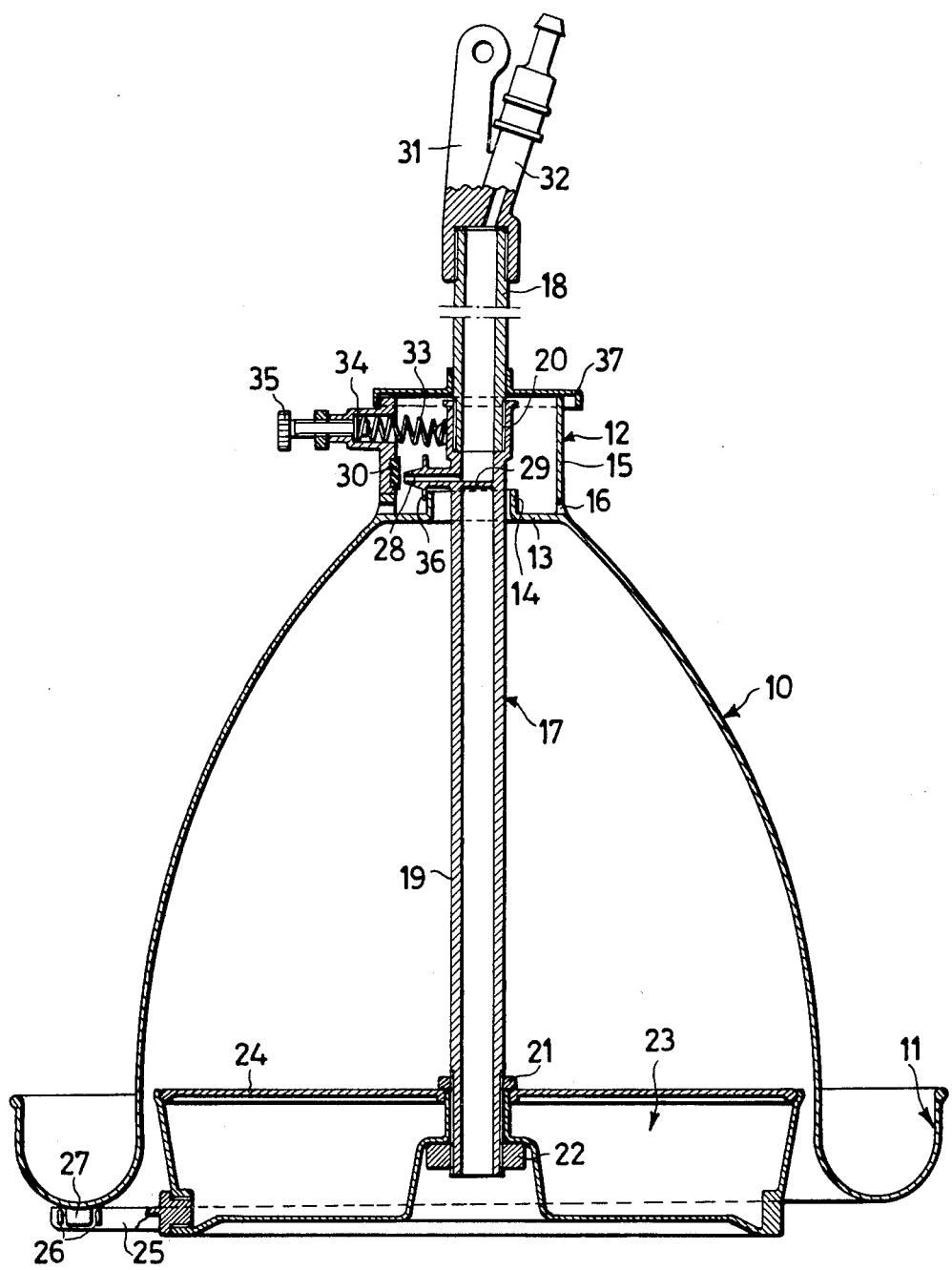

WATERING-TROUGH FOR CHICKENS AND LIKE FOWL

This invention relates to a watering-trough for chickens and like fowl, which is adapted for being hung or placed to rest on the ground.

From the U.S. Pat. No. 3,590,782 a chicken watering-trough is known, which comprises a tray intended to hold the water for the chickens, a valve for controlling the inflow of water to said tray, a rod for hanging the tray and resilient means for connecting the rod to the tray so as to permit an axial ascending motion of the tray relative to the rod as soon as the water in the tray falls below a determined level for causing the opening of the valve and the inflow of more water into the tray.

In order to stabilize the water-trough and to dampen its oscillation as when the chickens drink the water of the hung tray, a ballast is provided, which is fastened to the hanging rod independently of the resilient connection and springing means of the try so as not detrimentally to affect the sensitivity of the control means for the water-feeding valve.

This watering-trough has the shortcoming that it cannot be placed resting on the ground since in this case the tray would be lifted relative to the suspension rod so that the valve which feeds the tray would be constantly open. Thus, the watering-trough cannot be used for small fowl, such as chicks, since these latter could not drink from a tray aloft over the ground.

It has thus been suggested (such as in U.S. Pat. No. 3,685,495) to arrange the ballast rigidly connected to the suspension rod so as to protrude downwards relative to the try bottom wall and to act also as a supporting baseplate for the watering trough. By so doing, it has been provided for a trough which, consistently with the requirements, can be either hung or, indifferently, placed on the ground.

These conventional watering troughs have, all in common, the defect of being both intricate and unreliable in use. The axial shift of the try relative to the suspension rod against the bias of the resilient connection means requires an intricate guiding assembly with the inherent risk of jammings and thus of a continuous seeping of water through the feeding valve since the latter is easily opened for any movement whatsoever of the watering trough. In addition, such a valve has narrow passageways and in the flow path a filter is usually provided, so that there is the risk of clogging by the agency of impurities entrained by the water. The suspension and guiding system for the try comprises a number of component parts which do not allow for a simple manufacture and which require a cumbersome assemblage work in addition to a frequent upkeep. An object of the present invention is to provide a watering trough to be hung or placed straight on the ground and which, even while retaining the favorable features of the conventional makes, permits a simplified production and assemblage along with a reduced number of components parts while ensuring a more reliable operation without requiring continuous attendance. The invention achieves such objects with a watering trough of the conventional type comprising a water tray, a valve for feeding said tray with water, a suspension rod, resilient means active between the tray and the rod so as to permit movements of the try relative to the rod to open said valve as the level of the water in the try falls below a preselected value, and a ballast directly secured to the rod and projecting downwards relative to the try bottom wall, such watering trough being characterized in that said ballast has integral therewith a supporting member which acts like an eccentrical resting point and a pivotal point for the oscillations of the tray about a horizontal axis, and in that said resilient means active between the rod and the try hold the tray against said supporting member and tend to have it swinging in a direction about said pivotal point and in that said valve is composed by a nozzle integral with said rod and by a plug integral with the tray so that said plug, as it contacts said nozzle to stop the valve restricts the swinging motion of the tray against the bias of said resilient means, an abutment being further provided for limiting the amplitude of oscillation of the tray under the action of said resilient means.

When the tray is rotated about the pivotal point towards the abutment, the valve is thus open and allow water to feed the tray. The weight of the water collected in the tray thus causes the swinging motion of the latter against the bias of the resilient means and, as a preselected level of water in the tray is attained, the angle of oscillation takes such a value that the plug shuts the valve and the waterinflow is discontinued: under these conditions, the tray is in a substantially horizontal trim with its bottom wall parallel to the surface on which the ballast rests.

As the chickens gradually drink the water of the tray, the weight of the water in the latter is decreased, so that the tray, under the bias of the resilient means, is caused to oscillate and the plug is withdrawn from the nozzle and the water-feeding valve is opened to restore the water level in the tray.

The sensitivity of such angular shift of the tray can be adjusted by properly regulating the preload of the resilient means.

The tray may have an annular shape and can be arranged with advantage, conventionally, in correspondence with the lower edge of a bell-shaped member, the latter being freely slipped on the suspension rod and surrounds the ballast fastened to the bottom end of such rod.

According to a preferred embodiment of the invention, the bell-shaped member carries at the top an annular hollow body having a closed bottom wall and which is possibly fitted with a lid which latter surrounds the nozzle integral with the suspension rod, said hollow body carrying the plug intended to cooperate with the nozzle and displaying at least one opening for the feed of water, the latter sweeping the outer surface of the bell-shaped member and so reaching the annular tray. The resilient means are active between said hollow body and the suspension rod.

The features and advantages of the watering trough according to the invention will become more clearly apparent from the ensuing description of an advantageous embodiment as illustrated in the accompanying drawings, the single FIGURE of which shows the watering trough in axial cross-sectional view.

As viewed in the drawing, the watering trough has a bell-shaped member 10, which, in correspondence with its bottom edge carries an annular tray 11. Atop, the bell-shaped member 10 carries a hollow body 12 of annular shape closed by a bottom wall 13 and with an internal wall 14 at a lower level than the outer wall 15. The outer wall 15 of such annular hollow body 12 has, in correspondence with the bottom wall 13 at least one port 16.

The assembly composed by the bell member 10 with tray 11 and hollow body 12 is freely slipped onto a rod 17 which passes through the assembly in axial direction, For convenience of assemblage, the rod 17 is composed by a top barrel 18 and a bottom barrel 19, the latter having a sleeve 20 into which the top barrel 18 is screwably fastened.

To the bottom end of the bottom barrel 19 there is fastened, between a washer 21 and a nut 22, an annular container 23 which can be closed by a lid 24 and is intended to hold ballast material, such as water. The bottom wall of the container 23 serves also to have the watering trough resting on the ground.

On a side (at the left, as viewed on the drawing) the ballast holder 23 carries a supporting bracket 25 which can be screwed onto the holder wall and which has two ribs 26 between which is inserted, with a certain clearance, a bottom projection 27 of the tray 11. The supporting bracket 25 is thus an eccentrical resting site for the tray 11 and its ribs 26 with the projection 27 provide an oscillation pivot with horizontal axis about which the tray 11 can swing within a certain angular range.

The bottom barrel 19 of the stud 17 has, slightly beneath the sleeve 20, a nozzle 28 which juts into the hollow body 12 of annular shape in the same direction as that in which the supporting bracket 25 juts from the ballast holder 23. Slightly beneath the nozzle 28, the lower barrel 19 is closed by a transversal diaphragm 29.

On the internal surface of the outer wall 15 of the hollow annular body 12 at a point confronting the nozzle 28, there is a plug 30, for example of rubber, intended to stop the nozzle exit port by contacting same.

The top end of the top barrel 18 of the rod 17 carries, screwed thereon, a member 31 which can be used for suspending the trough. Said piece 31 has, integral therewith, a fitting 32 for a water hose (not shown), which opens into the interior of the barrel 18.

Water entering the barrel 18 then reaches the nozzle 28 (it cannot go beyond in the barrel 19 since there is the transversal diaphragm 29) and if the nozzle is open, water fills the annular hollow chamber 12 and exits same through the ports 16 and, by sweeping the outer surface of the bell member 10, reaches the annular tray 11.

It has been stated that the assembly composed by the bell member 10 and the hollow chamber 12 can be oscillated about the pivotal point formed by the engagement of the projection 27 between the ribs 26 of the supporting bracket 25.

Now, between the central stud 17 and the outer wall 15 of the body 12, a spring 33 is active which tends to have the assembly to swing in the sense of pushing the plug 30 away of the nozzle 28. More detailedly, the spring 33 is arranged above the nozzle 28 and acts between the sleeve 20 connecting the barrels 18 and 19 and a seat 34 formed on the wall 15 of the body 12. An adjusting screw 35 permits to preset the bias of the spring 33. Under the bias of the spring 33, the hollow body 12 is tilted relative to the central stud 17 (towards the left, as viewed in the drawing) and such bias keeps also the tray 11 resting against the supporting bracket 25. The shift caused by the bias of the spring 33, which corresponds to a swing of the assembly bell 10 - body 12 about a horizontal axis passing through the pivotal point aforementioned, is restrained by the abutment of the edge of the inner wall 14 of the body 12 against an abutment bead 36 integral with the nozzle 28 (as shown in the drawing). Under these conditions, such assembly bell 10-body 12 takes a slightly tilted trim when resting against the supporting bracket 25.

If, under these circumstances, water is fed through the fitting 32, such water will find the nozzle 28 open and will ooze along the path already described into the tray 11, to be collected therein: as the water level is raised in the tray 11, the water load counterbalances the bias of the spring 33 and causes the assembly bell 10-body 12 to lean in the sense of approaching the plug 30 to the nozzle 28 until stopping the latter and cutting off the water feed to the tray 11 as soon as a preselected water level has been established in it.

It is apparent that by varying the preload of the adjusting spring 33 by manipulating the setting screw 35, it is possible to vary the instant of time at which the plug 30 cuts off the water feed through the nozzle 28, so that the level in the tray 11 can be regulated.

As the chickens drink the water in the tray 11, the water level in it goes down so that the assembly bell 10-body 12, under the bias of the spring 33, begins to be tilted in the sense of withdrawing the plug 30 from the nozzle 28 and allowing the water feed to occur until the level in the tray 11 has been restored to its original position.

As can be seen from the foregoing description, the watering trough according to the invention distinguishes over the prior art in the particular field of application by its constructional and operational simplicity, the reduced number of component parts which can be predominantly manufactured as molded plastics pieces, the ease of assemblage and the great sensitivity of adjustment of the water level in the tray.

The annular chamber 12 overlying the bell 10 and which houses the spring 33 and the nozzle 28 can be appropriately closed by a protection lid 37 which can be fastened to the rod 17 while leaving free a lateral room sufficient to permit the lateral oscillation of the body 12.

A special advantage is the simplicity of the water feed valve which is reduced to a simple nozzle to be stopped by a plug and which is thus exempt from easy clogging.

Also the risk of jamming is virtually nonexistent since the assembly of bell 10 and body 12 freely oscillates without requiring any guideway and the like.

It is to be noted, lastly, that the cleanup of the water trough can be easily performed without disassembling, or otherwise, the component parts of the device. When the bell 10 with the tray 11 are positioned in their tilted trim, the dirt possibly contained in the tray tends to collect in the bottom portion in correspondence with the pivotal point of the oscillation so that the opposite side of the tray will stay always clean.

The watering trough can be hung, or placed resting on the ground as preferred and will always be fairly stable.

It is understood that constructional details can be changed without departing from the scope of this invention.

I claim:

1. A watering trough for chickens and like fowl adapted to be hung or placed to rest on the ground, comprising a water tray, a valve for feeding water to the tray, a suspension stud, resilient means active between said stud and said tray so as to permit movements of the latter relative to the stud for opening said valve when the water level in the tray goes below a preselected value, and a ballast directly attached to the stud and projecting downwards relative to the bottom wall of the tray, characterized in that said ballast has integral therewith a supporting member which acts as a resting point of eccentricity and as pivot for the oscillations of said tray about a horizontal axis, in that said resilient means acting between the stud and the tray maintain the tray resting against said supporting member and tend to swing the tray in a direction about said pivot and in that said water feeding valve is composed by a nozzle integral with said stud and by a plug integral with the tray so that said plug when comes into contact with said nozzle for closing the valve limits the oscillation of the tray against the bias of said resilient means, an abutment being further comprised for limiting the oscillation of the tray under the bias of said resilient means.

2. A watering trough according to claim 1, characterized in that said resilient means can be adjusted.

3. A watering trough according to claim 1, characterized in that the tray has an annular form and is arranged in correspondence with the bottom edge of a bell member which carries at its top an annular hollow body with a closed bottom wall and with side ports, said body being arranged around the nozzle solid with the stud and carrying the plug intended to stop the nozzle, said resilient means acting between the stud and said hollow body.

4. A watering trough according to claim 3, characterized in that said resilient means overlie the nozzle and lie substantially on the same radial plane relative to the stud which also contains the nozzle and the supporting member for the tray.

5. A watering trough according to claims 3 or 4, characterized in that the annular hollow body has an outer wall which carries the nozzle stopping plug and in which a seat is formed for a screw which adjusts a spring acting against the central suspension rod.

6. A watering trough according to claims 1 or 3, characterized in that said abutment is the abutment of the edge of the inner wall of the annular hollow body against a member integral with the nozzle.

7. A watering trough according to claim 3, characterized in that the annular hollow body is closed by a protection lid.

* * * * *